Nov. 4, 1930.                    C. E. CARY                    1,780,615
                         HINGE MEANS FOR LAVATORY BOWLS
                          Filed April 24, 1929        2 Sheets-Sheet 1
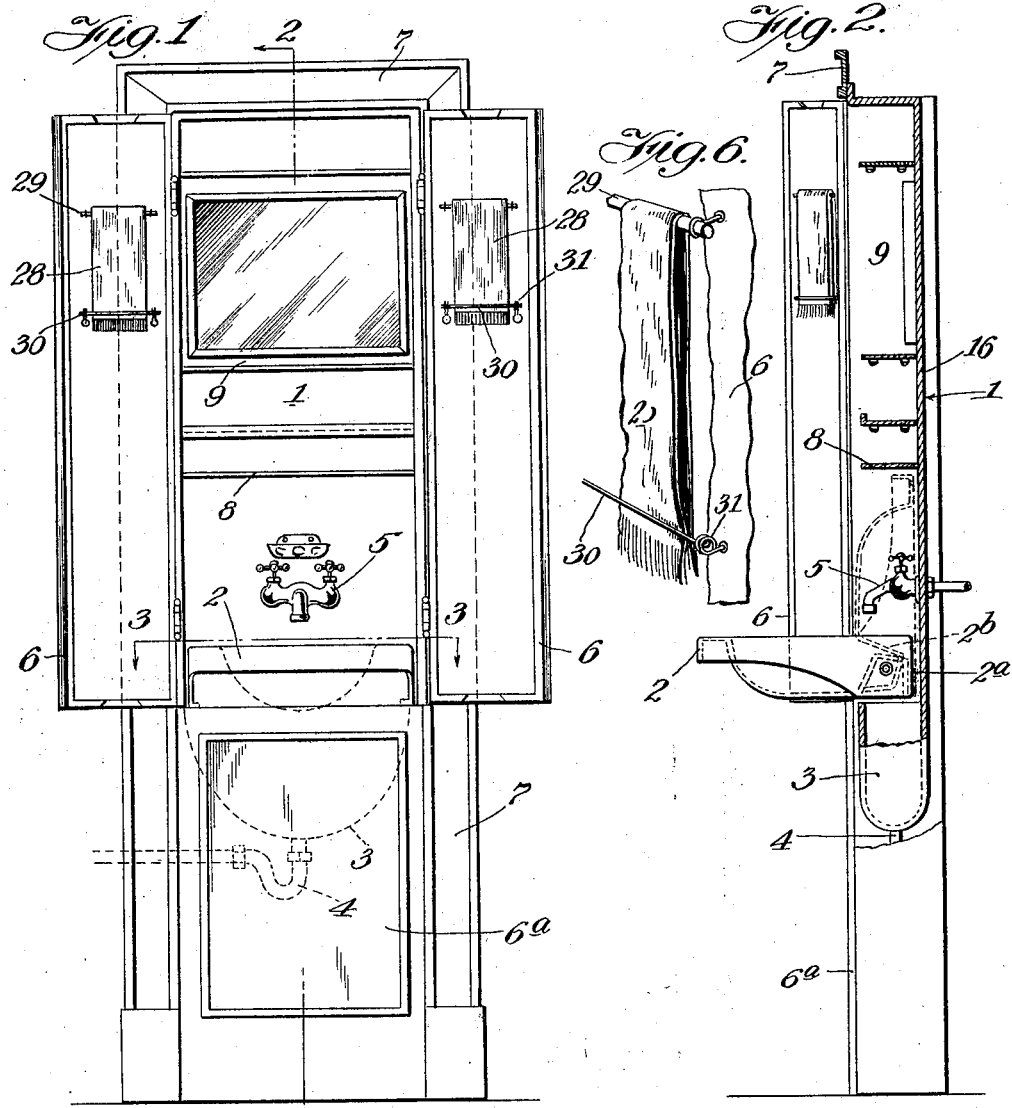
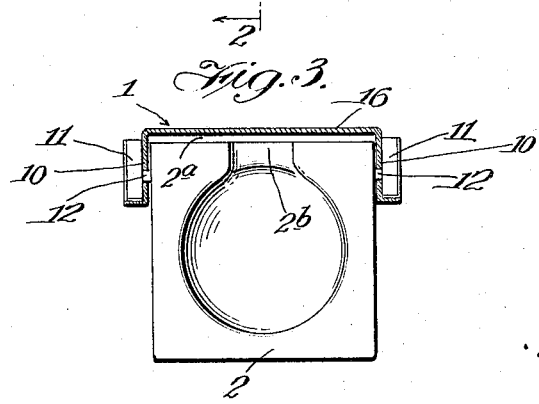
Inventor:
Clifford E. Cary.
By
Atty.

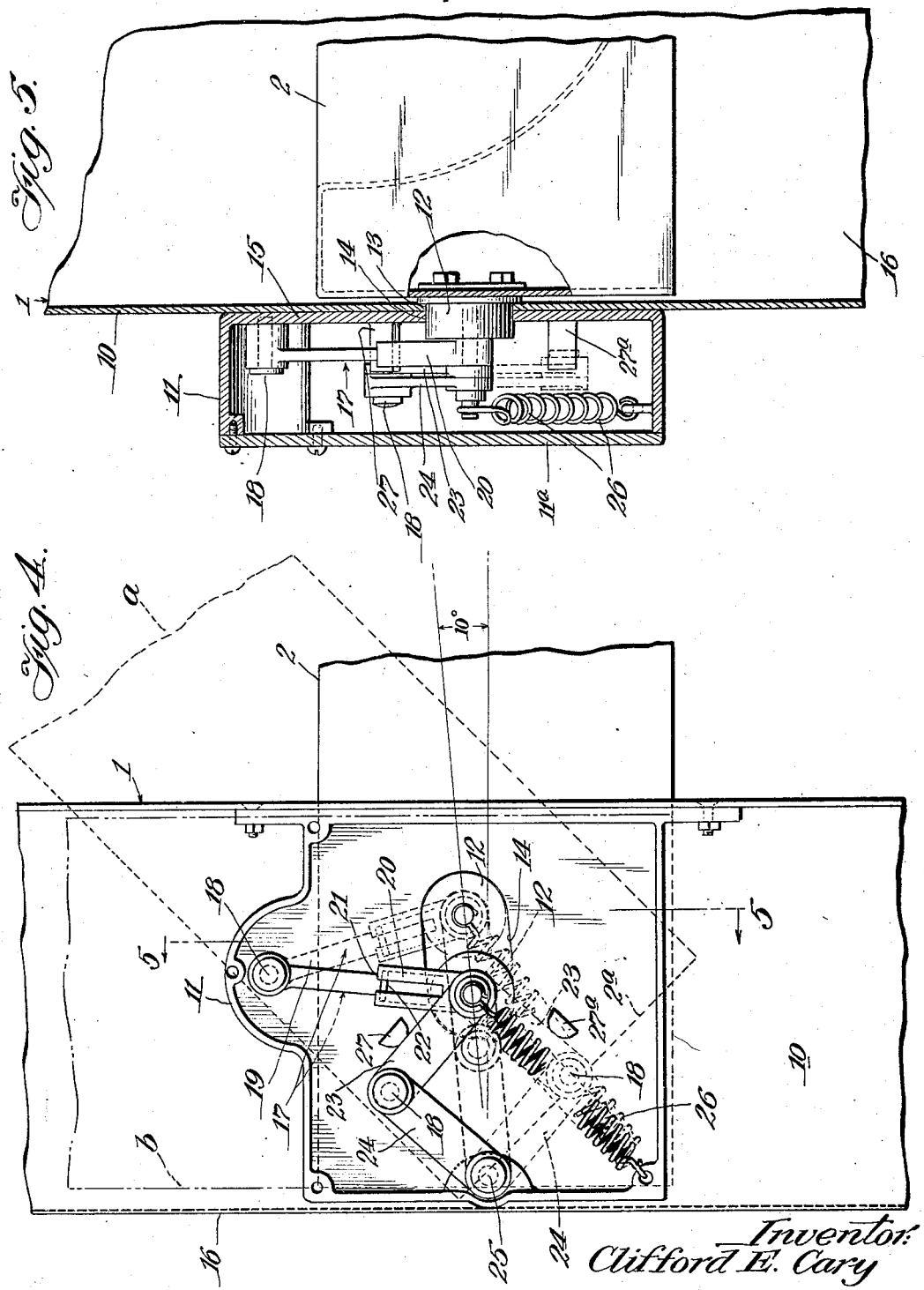

Patented Nov. 4, 1930

1,780,615

UNITED STATES PATENT OFFICE

CLIFFORD E. CARY, OF CHICAGO, ILLINOIS

HINGE MEANS FOR LAVATORY BOWLS

Application filed April 24, 1929. Serial No. 357,618.

This invention relates to improvements in hinge means for foldable lavatory wash basins or bowls, such as are employed in wall cabinets or similar fixtures, the latter having doors on their front sides to close the cabinets and conceal the bowls therein after the bowls have been folded up into the cabinets when not in use.

One object of my invention is to provide a hinge means which will be smooth and quiet in its operation so that no noise will be produced when swinging the bowls into and out of the cabinets.

Another object of my invention is to provide means in the hinge means to limit the approach of the bowl toward the rear wall of the cabinet in the swinging of the bowl into and out of the cabinet, so that the bowl will not hit the cabinet on reaching its terminal positions, thereby eliminating noise and also provide a water clearance between the rear end of the bowl and the rear wall of the cabinet when the bowl is extended out of the cabinet in its position of use.

Another object of my invention is to provide a connected arm and link arrangement in the hinge means at each side of the bowl so as to control the movements of the hinge mechanism in the swinging of the bowl, and thus make the hinge action uniform on each side of the bowl.

A further object of my invention is to provide a hanger in connection with the hinge means at each side of the bowl so that the load of the bowl will be supported through the hanger in the terminal positions of the bowl, thereby permitting heavier bowls to be used, and also prevent injury or damage to the hinge means should any one sit on the bowl when it is extended out of the cabinet or place any heavy article on the same.

A further object of my invention is to pitch or incline the slots in the hinge means in such a manner that gravity may aid the spring in returning the bowl to its terminal positions as the bowl reaches the end of its swinging movement, thereby economizing on space by allowing the bowl to be used within its own depth in the cabinet when the bowl is folded into the same, and also to prevent undue extending of the bowl out of the cabinet when the bowl is in its usable position.

The invention consists further in the matters hereinafter described and claimed.

In the accompanying drawings—

Fig. 1 is a front view of a lavatory fixture in which the bowl or basin thereof is hinged in the cabinet by a hinge means of my invention;

Fig. 2 is a vertical sectional view, with parts in elevation, taken on line 2—2 of Fig. 1;

Fig. 3 is a horizontal sectional view taken on line 3—3 of Fig. 1;

Fig. 4 is a view of the hinged structure at one side of the bowl looking into the housing for the hinge;

Fig. 5 is a vertical sectional view taken on line 5—5 of Fig. 4; and

Fig. 6 is a perspective view showing my towel rack and retainer, to be hereinafter described.

The lavatory fixture shown in the drawings comprises a sheet metal cabinet 1 adapted to be supported in a vertical position in or ahead of a wall of the room in which the fixture is installed. A wash basin or bowl 2 is hinged in the cabinet adjacent its lower end by hinged means of my present invention.

The bowl 2 is arranged above a waste guide 3 forming the lower part of the cabinet and into which guide the bowl empties on being swung into a vertical position back into the cabinet, the rear or inner end of the bowl being formed to provide a water discharge passage $2^b$, as in lavatory fixtures of this general character. The guide 3 drains into a trap 4 which is connected to the bottom wall of the guide, and forms part of the plumbing which serves to carry off the waste water from the guide.

A faucet 5 is mounted within the cabinet 1 to supply hot and cold water or a mixture thereof to the bowl 2 when the latter is swung down into usable position extending substantially horizontally out of the cabinet, as shown in Figs. 1 and 2. The faucet 5 is so located that it is taken into the water holding chamber or cavity in the bowl when the latter is swung into its vertical non-usable position in the cabinet, as shown in dotted lines b in Figs. 1 and 4. When the bowl is in this position, it is located entirely within the cabinet, and may be concealed from view by closing the doors 6, 6 which are hinged to the finishing frame 7 at the open front side of the cabinet. The doors 6 extend from the upper edge of the guide 3 to the top of the cabinet and close over the shelves 8 and the compartment 9 within the cabinet above the faucet 5. The waste guide 3 is concealed from view by a panel 6ª hinged or removably mounted in the lower portion of the frame 7.

The hinge means of my invention comprises a pair of similar hinge mechanisms, one on each side of the bowl 2, and located on the outer sides of the side walls 10, 10 of the cabinet 1 in housings 11, 11 which are secured to said side walls, as shown in Figs. 3, 4 and 5. The bowl 2 is provided on its opposite sides with trunnions 12, 12 which are fixed to the bowl against rotation with respect thereto and extend into the housings 11 through registering slots 13, 14 in the side walls 10 of the cabinet 1 and in the rear wall 15 of each housing. These slots are substantially straight and extend in a direction outward from the rear wall 16 of the cabinet 1 to permit bodily movement of the bowl with respect to the cabinet so that the rear end 2ª of the bowl, which is made square, will clear the rear wall 16 of the cabinet as the bowl is swung into and out of the same on its hinge means. Making the slots elongated also allows the bowl 2 to be brought back relatively close to the rear wall 16 of the cabinet in the terminal positions of the bowl, thereby economizing on space, by having the bowl concealed within its own depth within the cabinet, when folded up into the same, and projecting no further than necessary out of the cabinet when in usable position. The slots 13, 14 are pitched or are inclined upwardly at about 10° to the horizontal so that gravity will assist the spring means, to be hereinafter described, in the automatic return of the bowl to the inner or rear ends of the slots as the bowl reaches its terminal positions.

Hangers 17 are employed in the hinge means, one in each housing 11. The hangers are arranged transverse to the length of the slots 13, 14 and extend above the same. The upper ends of the hangers are fulcrumed on pins 18 which are secured to each of the rear walls 15 of the housings 11. The lower ends of the hangers are pivotally connected with the associated trunnions 12, the latter having reduced outer ends which extend through eyes or openings, one in each hanger. Each hanger 17 is composed of two parts, an upper part 19 and a lower part 20, said parts having telescopic or sliding connection with each other so that the hanger may shorten itself as the trunnions 12 move back and forth in the slots which extends straight across the arch of movement of the hangers about their fulcrums 18. When at the ends of the slots, the shoulders 21, 22 at the adjacent ends of the hanger parts 19, 20 are in contact so that the hangers in conjunction with the stops to be hereinafter referred to, will support the load of the bowl in both of its terminal positions. By reason of these arrangements, the bowl 2 may be made heavier than heretofore, so as to withstand greater wear and tear and reduce noise by being heavy enough not to vibrate. Moreover, china or vitreous bowls may be used, because the hangers and the stops provide sufficient support for such bowls which are necessarily heavier than pressed metal bowls.

To automatically move the trunnions 12, 12 to the outer ends of the slots 13, 14 in the act of swinging the bowl into and out of the cabinet so that the inner end of the bowl will clear the rear wall 16 of the cabinet and thus permit swinging of the bowl, I provide the following construction.

Fixed to the outer end of each trunnion 12 in the housing 11 is an arm 23. The arms 23 are rigid with the trunnions 12 so that they turn with the trunnions in the rotation of the latter with the bowl 2 in its swinging movement. The arms 23 are disposed at an angle to the length of the bowl, preferably 45°, as shown in the drawings, and when the bowl is in its terminal positions, the arms extend rearward from the inner ends of the slots at upward and downward inclinations, respectively. Associated with each arm 23, is a link 24. The links 24 are arranged to the rear of the arms 23 and are fulcrumed at their inner ends in the housings 11 on fixed pins 25. The outer or swinging ends of the links 24 are pivotally connected with the outer or swinging ends of the arms 23.

By the arrangement described, the arms 23 swing about their fulcrums 25 as the bowl is swung into and out of the cabinet 1, and the trunnions 12 are positively and mechanically moved back and forth in the slots 13, 14. This imparts bodily movement to the bowl toward and from the rear wall 16 of the cabinet so that the rear end of the bowl will clear said rear wall as the bowl is swung and returned back close to said rear wall. When the trunnions 12 reach the outer ends of the slots 13, 14, the bowl 2 is mid-way of its swinging movement, as indicated by the dash position a in Fig. 4. At this time, the full length of each connected arm 23 and link 24 is effective, the parts being straightened and in endwise alignment and parallel to the length of the respective sets of slots 13, 14, as indicated in Fig. 4.

As the links 24 move above and below the slots, the links swing backward, that is, toward the rear wall 16 of the cabinet and draw the trunnions to the rear or inner ends of the slots. This returns the bowl back toward the rear wall of the cabinet as the bowl reaches its terminal positions. Spring means 26, 26 are provided to aid in this return movement, in addition to gravity which acts by reason of the weight of the bowl and the pitch given to the slots. The springs, one in each housing, are anchored at one end thereto, and have their other ends connected with the outer ends of the trunnions 12, preferably on the outer sides of the arms 23. The springs 26 are arranged to always draw inward on the trunnions 12 and thus normally retain them at the inner ends of the slots 13, 14.

The stop means, heretofore referred to, may take the form of lugs 27, 27$^a$, a pair in each housing 11 fixed to the rear wall 15 thereof above and below the slots 13, 14 and positioned to be engaged by the outer edge of the associated arm 23 when the bowl is in its terminal positions, as shown in full and dotted lines respectively, in Fig. 4. Thus, the load of and on the bowl is amply supported, and the hinge means will not be broken or damaged should anyone place a suit case or other heavy article on the bowl or sit on the same when the bowl is lowered.

The inner ends of the slots 13, 14 and the stop lugs 27 also prevent the inner end 2$^a$ of the bowl, when in usable position, extending back into contact with the rear wall 16 of the cabinet 1, as shown in Fig. 4. Thus sufficient clearance is maintained between the bowl and said rear wall to allow water overflowing the water passage 2$^b$ at the rear end of the bowl, due to flooding of the bowl or otherwise to find free escape into the waste guide 3 below the bowl. This is an important feature of my invention because it provides a simple, cheap and effective overflow outlet for the bowl without the necessity of using a special and expensive overflow fixture of a design to accommodate a hinged bowl.

The inner ends of the slots 13, 14 and the stop lugs 27$^a$ prevent the bowl when swung up into the cabinet from coming into contact with the rear wall 16 of the cabinet. This is another important feature of my invention because the bowl does not hit the cabinet to mar either the finish of the cabinet or the bowl or produce noise when the bowl is folded back into the cabinet. Manifestly china, vitreous or enameled bowls may be used with my improved hinge means as the bowls in not striking the rear wall of the cabinet, either when swung into or out of the same, will not be chipped or cracked, as would happen should such bowls be used with the hinge arrangements heretofore employed which make it necessary for the bowls to contact with and rest against the rear wall of the cabinet in either terminal position of the bowl. Each housing 11 is closed by a cover plate 11$^a$.

The round bearing surfaces as provided in the hinge means, both for the trunnions 12 and hangers, links and arms, not only allows for smooth action of the parts, but also eliminates all noise as the bowl is swung into and out of the cabinet. This provides for a quiet acting fixture and makes it especially adaptable for installation in large apartment buildings, hotels and the like where elimination of all noise and ease of operation for fixtures of this kind are required.

On the rear side of each door 6, I provide an improved towel rack and retainer assembly. The towel 28 is looped over a hanger bar or rod 29, which is supported at its ends out of contact with the door by suitable brackets. The lower end of the towel is retained against the door by a holder 30 in the form of a wire with coils 31, 31 at its ends to yieldably hold the towel in place.

With bodily movement given the bowl 2 in its swinging movement, the rear end of the bowl may be made square, and thus be able to fit back in the cabinet to give a much neater and finished appearance and also to prevent soap or other articles from lodging between the inner end of the bowl and the rear wall of the cabinet. The hinge means is simple in construction and operation, and being the same on opposite sides of the bowl makes the movement the same on each side of the bowl, thereby eliminating any chance of the bowl getting out of line or having an irregular movement, which if allowed would promote noise.

The details of structure shown and described may be variously changed and modified without departing from the spirit and scope of my invention.

The inner ends of the slots 13, 14 at each side of the bowl and the stop lugs 27, 27$^a$ are at a fixed distance from the rear wall 16 of the cabinet 1 so as to limit the approach of the bowl to the rear wall of the cabinet and thus prevent the bowl from contacting with said rear wall in either terminal position of the bowl. The slots 13, 14 may be made slightly wider than the diameter of the trunnions 12 so as to reduce the friction as the trunnions turn in the slots, due to the fact that the trunnions bear only on the lower edges of the slots. Friction is also reduced by providing round bearing surfaces for the pivotal connections between the arms and links by making these connections relatively small in diameter so as to reduce the extent of bearing surface required and thus bring the friction and wear to the minimum.

I claim as my invention:

1. In a lavatory fixture, a bowl, a cabinet therefor and having a rear wall, and means providing a hinge mounting for the bowl in the cabinet, said means including stationary slots adjacent the sides of the bowl permitting bodily movement of the bowl as it is swung into and out of the cabinet so that the inner end of the bowl will clear said rear wall in the swinging of the bowl, said slots being pitched so that gravity will aid in the returning of the bowl to the inner ends of the slots as the bowl reaches its terminal positions.

2. In a lavatory fixture, a bowl, a cabinet therefor and having a rear wall, and means providing a hinge mounting for the bowl within the cabinet, said means including substantially straight stationary slots adjacent the sides of the bowl and extending outward from said rear wall, trunnions fixed to the sides of the bowl and extending into said slots, arms rigid with said trunnions and extending at an inclination rearwardly therefrom, and means acting on the arms in the swinging of the bowl into and out of said cabinet to move the trunnions back and forth in said slots.

3. In a lavatory fixture, a bowl, a cabinet therefor and having a rear wall, and means providing a hinge mounting for the bowl within said cabinet, said means including substantially straight stationary slots adjacent the sides of the bowl and extending outward from said rear wall, trunnions fixed to the sides of the bowl and extending into said slots, arms fixed to said trunnions and extending at an inclination rearwardly therefrom, and links having fixed fulcrums to the rear of said arms and pivotally connected therewith for causing movement of the trunnions back and forth in said slots in the swinging of the bowl into and out of said cabinet.

4. In a lavatory fixture, a bowl, a cabinet therefor and having a rear wall, and means providing a hinge connection for the bowl within said cabinet, said means comprising substantially straight stationary slots adjacent the sides of the bowl and extending outward from said rear wall, trunnions fixed to the sides of the bowl and extending into said slots, arms fixed to said trunnions and extending at an inclination rearwardly therefrom, links having fixed fulcrums to the rear of the arms and pivoted therewith for causing movement of the trunnions back and forth in said slots in the swinging of the bowl into and out of said cabinet, and spring means for normally returning the trunnions to the inner ends of the slots.

5. In a lavatory fixture, a bowl, a cabinet therefor and having a rear wall, and means providing a hinge mounting for the bowl within said cabinet, said means including substantially straight stationary slots adjacent the sides of the bowl and extending outwardly from said rear wall, trunnions fixed to the sides of the bowl and extending into said slots, hangers for the trunnions and fulcrumed above the slots to support the load of the bowl in its terminal positions, and means acting on the trunnions in the swinging of the bowl into and out of the cabinet to move the trunnions back and forth in said slots.

6. In a lavatory fixture, a bowl, a cabinet therefor and having a rear wall, and means providing a hinge mounting for the bowl within said cabinet, said means including substantially straight stationary slots adjacent the sides of the bowl and extending outwardly from said rear wall, trunnions fixed to the sides of the bowl and extending into said slots, hangers for the trunnions and fulcrumed above the slots, said hangers consisting of slidably connected parts to allow for shortening of the hangers as they swing along the length of the slots, and means acting on the trunnions in the swinging of the bowl into and out of the cabinet to move the trunnions back and forth in the slots.

7. The combination with a cabinet having a rear wall, of a member, and means providing a hinge connection for the member with the cabinet, said means including substantially straight slots at the sides of the member and extending outward from said rear wall, trunnions fixed to the sides of the member and extending into said slots, arms rigid with said trunnions, and links having fixed fulcrums and pivotally connected with said arms for causing movement of the trunnions back and forth in the slots in the swinging of the member into and out of the cabinet.

In testimony whereof I affix my signature.

CLIFFORD E. CARY.